United States Patent [19]
Grochowicz

[11] Patent Number: 5,363,893
[45] Date of Patent: Nov. 15, 1994

[54] TABLE SAW EXTENSION APPARATUS

[76] Inventor: Sebastian F. Grochowicz, 2047 Charleston Ave., Erie, Pa. 16509

[21] Appl. No.: 165,636

[22] Filed: Dec. 13, 1993

[51] Int. Cl.⁵ ............................................. B25H 1/00
[52] U.S. Cl. .................................. 144/287; 83/477.2; 108/69; 108/73; 144/286 R
[58] Field of Search ............... 144/286 R, 286 A, 287; 108/62, 65, 69, 71, 73; 83/471, 477.1, 477.2, 574

[56] References Cited

U.S. PATENT DOCUMENTS

| | | | |
|---|---|---|---|
| 746,972 | 12/1903 | Marsh | 144/287 |
| 1,848,475 | 3/1932 | Hackett | 108/69 |
| 1,864,840 | 6/1932 | Lehner | 144/287 |
| 3,695,189 | 10/1972 | Felder | 108/69 |
| 4,209,045 | 6/1980 | Bassett | 144/287 |
| 4,265,284 | 5/1981 | Taylor | 144/287 |
| 4,677,920 | 7/1987 | Eccardt | 108/69 |
| 4,798,113 | 1/1989 | Viazanko . | |
| 4,852,623 | 8/1989 | Rodrigues . | |
| 4,955,941 | 9/1990 | Rousseau . | |
| 4,964,450 | 10/1990 | Hughes et al. . | |
| 5,004,029 | 4/1991 | Garner . | |
| 5,115,847 | 5/1992 | Taber | 108/69 |
| 5,261,304 | 11/1993 | Stollenwerk et al. | 144/287 |

*Primary Examiner*—W. Donald Bray

[57] ABSTRACT

A new and improved table saw extension apparatus includes a pair of support arm assemblies attachable to respective ends of a table saw. A cross member assembly is supported by the support arm assemblies and includes an assembly for relative vertical adjustment of the cross member assembly with respect to the support arm assemblies. The cross member assembly also includes an assembly for relative horizontal adjustment of the cross member assembly with respect to the support arm assemblies. The cross member assembly includes a base member attached to the support arm assemblies. A first adjustment member is adjustably connected to the base member. The first adjustment member includes a plurality of vertical channels permitting the first adjustment member to be adjusted vertically with respect to the base member. The first adjustment member also includes a horizontal channel. A first securing assembly is used for securing the first adjustment member with respect to the base member at a selected vertical adjustment position. A second adjustment member is supported by the horizontal channel and can be slid horizontally in the horizontal channel for permitting the second adjustment member to be adjusted horizontally with respect to the support arm assemblies. A second securing assembly is used for securing the second adjustment member with respect to the first adjustment member.

6 Claims, 2 Drawing Sheets

TABLE SAW EXTENSION APPARATUS

BACKGROUND OF THE INVENTION

1. Field of the Invention

The present invention relates generally to table saws and, more particularly, to devices especially adapted for extending the table in table saws.

2. Description of the Prior Art

Table saws are well known in the art, and the size of the table in the table saw is often too small to support many sizes of boards. As a result, throughout the years, a number of innovations have been developed relating to extending the table in a table saw, and the following U.S. patents are representative of some of those innovations: 4,798,113; 4,852,623; 4,955,941; 4,964,450; and 5,004,029.

More specifically, U.S. Pat. No. 4,798,113 discloses an extension table apparatus for a power saw that includes two extensions, one for each end of the table saw. Moreover, preferably, the extension apparatus is provided on its own wheeled base that is wheeled into or out of appropriate position. Instead of using two table extensions, for purposes of economy and simplicity it would be desirable if a table saw extension device were provided with a single table extension. In addition, for purposes of simplicity and economy, it would be desirable if a table saw extension device were attachable to the table saw and did not need a separate wheeled base.

U.S. Pat. No. 4,852,623 discloses an extension table for a table saw which includes metal adjustment chains for controlling the degree of extension of linearly adjustable parts. Chains have certain undesirable properties. They may rust or corrode. They may stretch under tension. They may snap as a result of metal fatigue. In this respect, it would be desirable if a table saw extension device were provided which did not use adjustment chains.

U.S. Pat. No. 4,955,941 discloses a support table for a bench saw which includes two extension portions, one for each side of the saw bench. Each extension portion includes its own respective foldable leg. As mentioned above, for purposes of economy and simplicity it would be desirable if a table saw extension device were provided with a single table extension. Moreover, also for purposes of economy and simplicity, it would be desirable if a table saw extension device were provided that did not require it own respective table leg support.

U.S. Pat. No. 4,964,450 discloses an extension for a table saw which has an adjustment mechanism for adjusting the vertical height of the extension. However, the extension in this patent does not appear to provide an adjustment mechanism for adjusting the extension in a horizontal or lateral dimension. In this respect, it would be desirable if a table saw extension device were provided which included an adjustment mechanism for adjusting the extension in a horizontal or lateral dimension in addition to adjusting the vertical height of the extension.

U.S. Pat. No. 5,004,029 discloses an extension for a table saw that includes two extension units, one for each side of the extension unit. The extension unit is independent of the saw table itself. Moreover, each extension unit includes a telescopic support strut that extends from the base of the independent support to an extension arm of the support. As mentioned above, it would be desirable is a table saw extension device were provided which is not independent of the table saw itself. Such independence causes greater cost and greater complexity. Moreover, it would also be desirable if a table saw extension device did not employ telescopic struts that extend from the base of the extension support to one of the extension arms. The use of telescopic struts adds to the complexity and costs of a table saw extension.

Still other features would be desirable in a table saw extension apparatus. For example, for purposes of simplicity and reduced costs, it would be desirable if a single adjustment element could be used for both vertical and horizontal adjustments of the extension unit.

Thus, while the foregoing body of prior art indicates it to be well known to use extensions for table saws, the prior art described above does not teach or suggest a table saw extension apparatus which has the following combination of desirable features: (1) provides a single table extension; (2) is attachable to the table saw and does not need a separate wheeled base; (3) does not use adjustment chains; (4) does not require its own respective table leg support; (5) includes an adjustment mechanism for adjusting the extension in a horizontal or lateral dimension in addition to adjusting the vertical height of the extension; (6) does not employ telescopic struts that extend from the base of the extension support to one of the extension arms; and (7) provides a single adjustment element that can be used for both vertical and horizontal adjustments of the extension unit. The foregoing desired characteristics are provided by the unique table saw extension apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved table saw extension apparatus which includes a pair of support arm assemblies attachable to respective ends of a table saw. A cross member assembly is supported by the support arm assemblies, and the cross member assembly includes means for relative vertical adjustment of the cross member assembly with respect to the support arm assemblies. The cross member assembly also includes means for relative horizontal adjustment of the cross member assembly with respect to the support arm assemblies. The support arm assemblies are connected to the table saw with bolts.

The cross member assembly includes a base member attached to the support arm assemblies. A first adjustment member is adjustably connected to the base member. The first adjustment member includes a plurality of vertical channels permitting the first adjustment member to be adjusted vertically with respect to the base member. The first adjustment member also includes a horizontal channel. A first securing assembly is used for securing the first adjustment member with respect to the base member at a selected vertical adjustment position. A second adjustment member is supported by the horizontal channel. The second adjustment member can be slid horizontally in the horizontal channel for permitting the second adjustment member to be adjusted horizontally with respect to the support arm assemblies. A second securing assembly is used for securing the second adjustment member with respect to the first adjustment member. The base member is connected to the support arm assemblies by bolts.

The first securing assembly includes a first threaded adjustment bolt for screwing into a first complementary threaded portion in the base member, and a first knob is connected to the first threaded adjustment bolt for controlling adjustment of the first threaded adjustment bolt into the base member. The first adjustment member is positioned between the first knob and the base member for being clamped between the first knob and the base member when the first threaded adjustment bolt is screwed into the base member.

The horizontal channel of the first adjustment member may be in the form of a trapezoidal-cross-section groove, and the second adjustment member includes a trapezoidal-cross-section tongue that slides in the trapezoidal-cross-section groove of the horizontal channel.

The second securing assembly includes a second threaded adjustment bolt for screwing into a second complementary threaded portion in the second adjustment member, and a second knob is connected to the second threaded adjustment bolt for controlling adjustment of the second threaded adjustment bolt into the second adjustment member. The second adjustment member is positioned between the second knob and the first adjustment member for being clamped between the second knob and the first adjustment member when the second threaded adjustment bolt is screwed into the first adjustment member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved table saw extension apparatus which has all of the advantages of the prior art and none of the disadvantages.

It is another object of the present invention to provide a new and improved table saw extension apparatus which may be easily and efficiently manufactured and marketed.

It is a further object of the present invention to provide a new and improved table saw extension apparatus which is of durable and reliable construction.

An even further object of the present invention is to provide a new and improved table saw extension apparatus which is susceptible of a low cost of manufacture with regard to both materials and labor, and which accordingly is then susceptible of low prices of sale to the consuming public, thereby making such table saw extension apparatus available to the buying public.

Still yet a further object of the present invention is to provide a new and improved table saw extension apparatus which provides a single table extension.

Still another object of the present invention is to provide a new and improved table saw extension apparatus that is attachable to the table saw and does not need a separate wheeled base.

Yet another object of the present invention is to provide a new and improved table saw extension apparatus which does not use adjustment chains.

Even another object of the present invention is to provide a new and improved table saw extension apparatus that does not require its own respective table leg support.

Still a further object of the present invention is to provide a new and improved table saw extension apparatus which includes an adjustment mechanism for adjusting the extension in a horizontal or lateral dimension in addition to adjusting the vertical height of the extension.

Yet another object of the present invention is to provide a new and improved table saw extension apparatus that does not employ telescopic struts that extend from the base of the extension support to one of the extension arms.

Still another object of the present invention is to provide a new and improved table saw extension apparatus which provides a single adjustment element that can be used for both vertical and horizontal adjustments of the extension unit.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
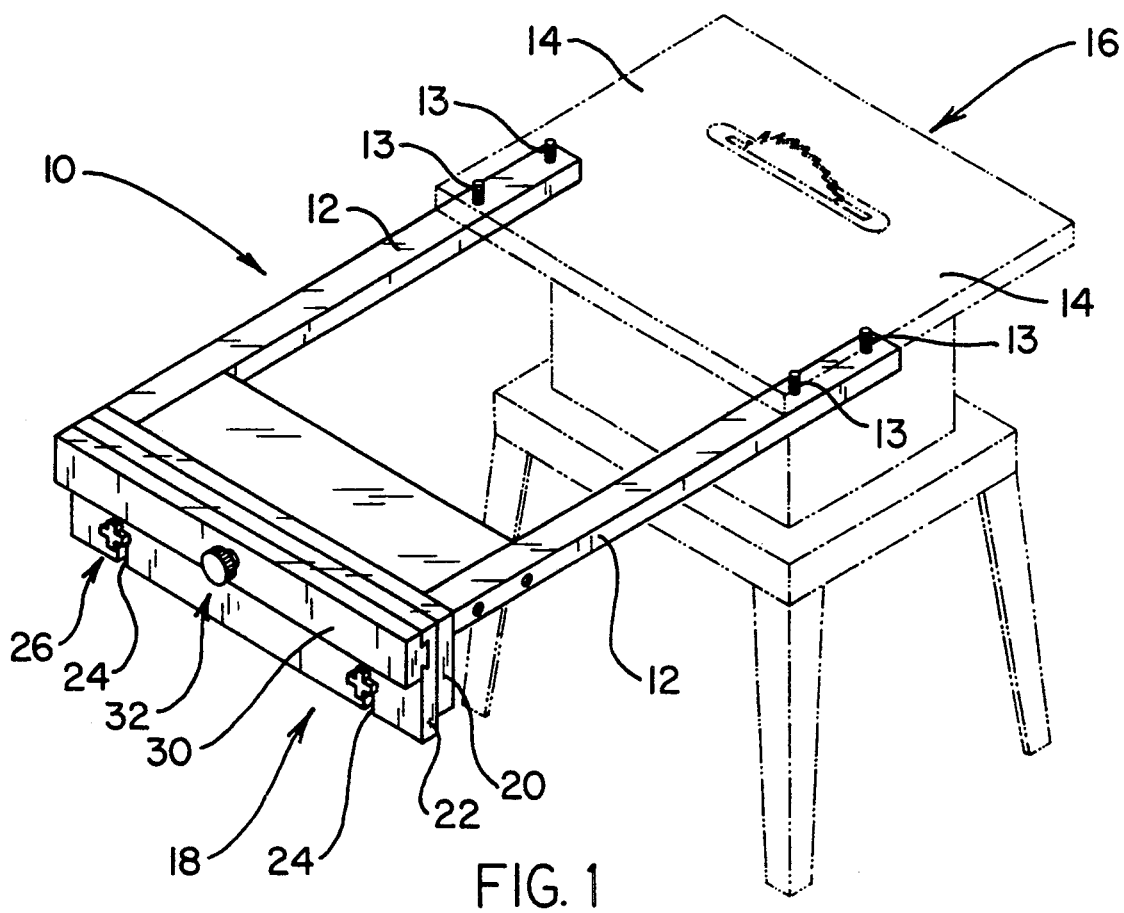
FIG. 1 is a perspective view showing a preferred embodiment of the table saw extension apparatus of the invention installed on a table saw.
Figure 2:
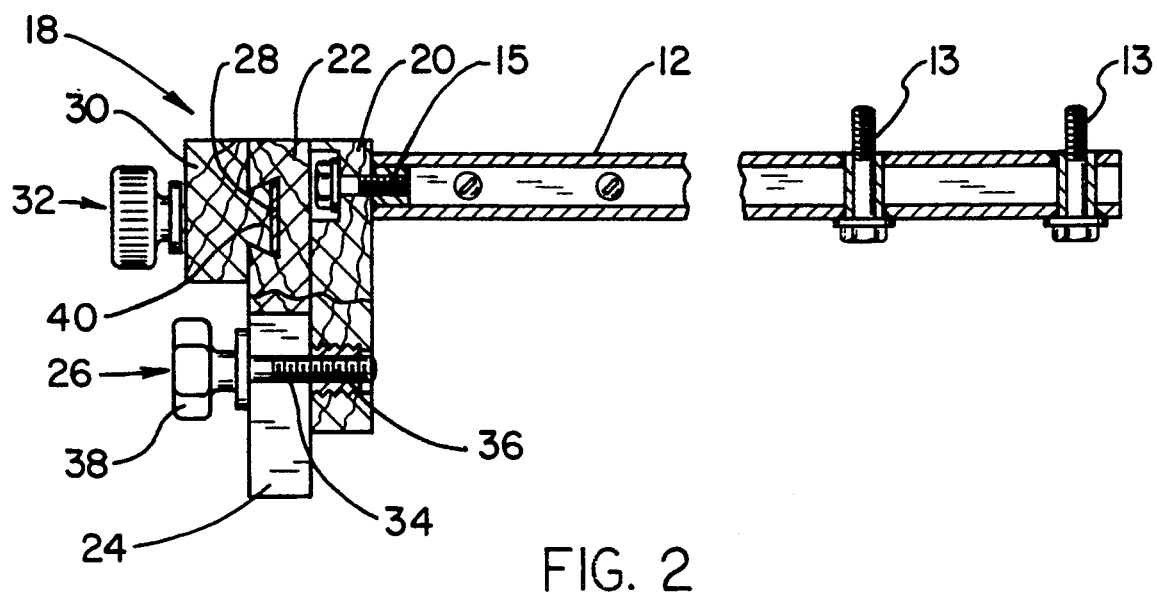
FIG. 2 is an enlarged side view, partially in cross-section, of the embodiment of the table saw extension apparatus shown in FIG. 1.

With reference to the drawings, a new and improved table saw extension apparatus embodying the principles and concepts of the present invention will be described.

Turning to FIGS. 1-4, there is shown an exemplary embodiment of the table saw extension apparatus of the invention generally designated by reference numeral 10. In its preferred form, table saw extension apparatus 10 includes a pair of support arm assemblies 12 attachable to respective ends 14 of a table saw 16. A cross member assembly 18 is supported by the support arm assemblies 12, and the cross member assembly 18 includes means for relative vertical adjustment of the cross member assembly 18 with respect to the support arm assemblies 12. The cross member assembly 18 also includes means for relative horizontal adjustment of the cross member assembly 18 with respect to the support arm assemblies 12. The support arm assemblies 12 are connected to the table saw 16 with bolts 13.

The cross member assembly 18 includes a base member 20 attached to the support arm assemblies 12. A first adjustment member 22 is adjustably connected to the base member 20. The first adjustment member 22 includes a plurality of vertical channels 24 permitting the first adjustment member 22 to be adjusted vertically with respect to the base member 20. The first adjustment member 22 also includes a horizontal channel 28. A first securing assembly 26 is used for securing the first adjustment member 22 with respect to the base member 20 at a selected vertical adjustment position. A second adjustment member 30 is supported by the horizontal channel 28. The second adjustment member 30 can be slid horizontally in the horizontal channel 28 for permitting the second adjustment member 30 to be adjusted horizontally with respect to the support arm assemblies 12. A second securing assembly 32 is used for securing the second adjustment member 30 with respect to the first adjustment member 22. The base member 20 is connected to the support arm assemblies 12 by bolts 15.

The first securing assembly 26 includes a first threaded adjustment bolt 34 for screwing into a first complementary threaded portion 36 in the base member 20, and a first knob 38 is connected to the first threaded adjustment bolt 34 for controlling adjustment of the first threaded adjustment bolt 34 into the base member 20. The first adjustment member 22 is positioned between the first knob 38 and the base member 20 for being clamped between the first knob 38 and the base member 20 when the first threaded adjustment bolt 34 is screwed into the base member 20.

The vertical height of the first adjustment member 22 with respect to the support arm assemblies 12 is adjusted by turning the first knob 38 to loosen the first threaded adjustment bolt 34, by shifting the vertical position of the first adjustment member 22 with respect to the support arm assemblies 12, by moving the first adjustment member 22 up or down guided by the vertical channels 24, by selecting a desired vertical position of the first adjustment member 22, and by retightening the first knob 38 to sandwich and secure the first adjustment member 22 between the first knob 38 and the base member 20.

The horizontal channel 28 of the first adjustment member 22 is in the form of a trapezoidal-cross-section groove, and the second adjustment member 30 includes a trapezoidal-cross-section tongue 40 that slides in the trapezoidal-cross-section groove of the horizontal channel 28.

The second securing assembly 32 includes a second threaded adjustment bolt 42 for screwing into a second complementary threaded portion 44 in the second adjustment member 30, and a second knob 46 is connected to the second threaded adjustment bolt 42 for controlling adjustment of the second threaded adjustment bolt 42 into the second adjustment member 30. The second adjustment member 30 is positioned between the second knob 46 and the first adjustment member 22 for being clamped between the second knob 46 and the first adjustment member 22 when the second threaded adjustment bolt 42 is screwed into the first adjustment member 22.

Figure 3:
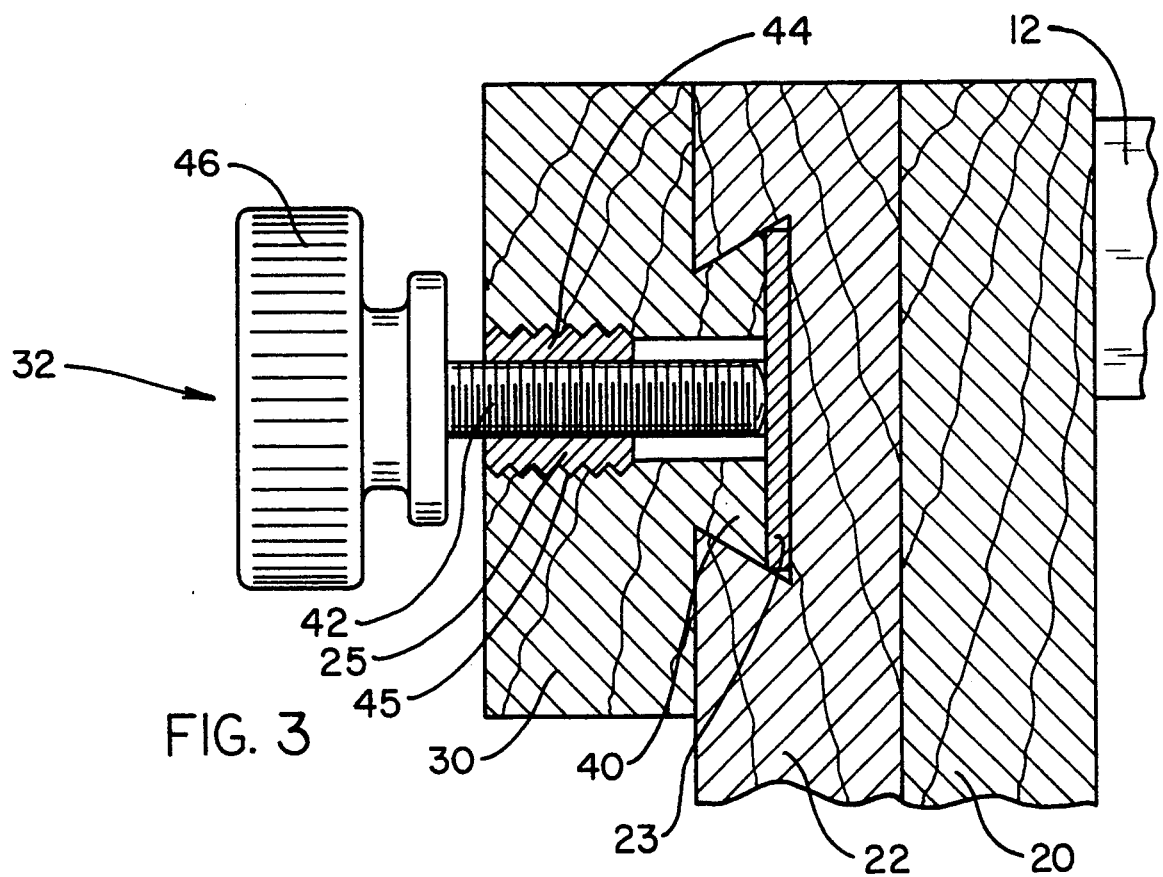
FIG. 3 is an enlarged cross-sectional view of the portion of the embodiment of the invention shown in FIGS. 1 and 2 which controls horizontal adjustment of the extension apparatus in a "Y" direction in an X-Y grid.
Figure 4:
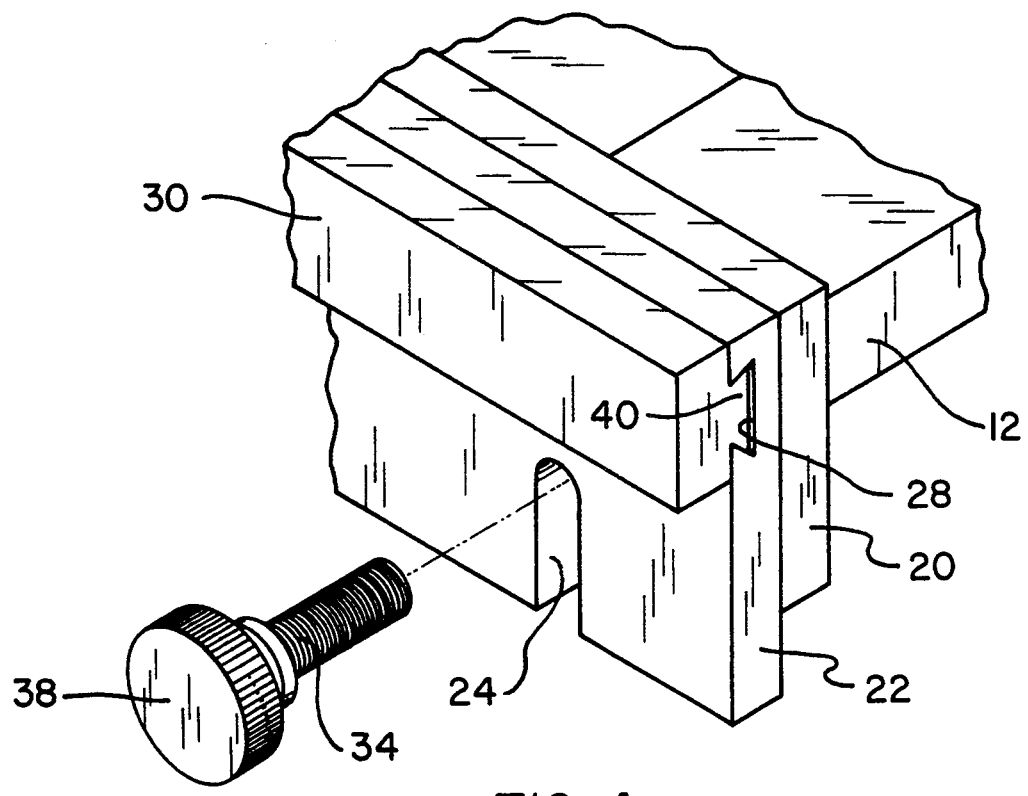
FIG. 4 is an enlarged perspective view of the portion of the embodiment of the invention shown in FIGS. 1 and 2 which controls vertical adjustment of the extension apparatus.

More specifically, the horizontal adjustment of the second adjustment member 30 with respect to the support arm assemblies 12 is adjusted by Fuming the second knob 46 to loosen the second threaded adjustment bolt 42, by shifting the horizontal position of the second adjustment member 30 with respect to the support arm assemblies 12, by moving the second adjustment member 30 horizontally back or forth guided by the horizontal channel 28, by selecting a desired horizontal position of the second adjustment member 30, and by retightening the second knob 46 to sandwich and secure the second adjustment member 30 between the second knob 46 and the first adjustment member 22. A pressure plate 23 is positioned between the second threaded adjustment bolt 42 and the first adjustment member 22. When the second threaded adjustment bolt 42 is screwed into the second adjustment member 30, the end of the second threaded adjustment bolt 42 exerts pressure on the pressure plate 23 which in turn exerts pressure on the first adjustment member 22. In addition, the walls of the trapezoidal-cross-section tongue 40 exert a pressure on the walls of the horizontal channel 28. In this way, the horizontal position of the second adjustment member 30 is secured with respect to the first adjustment member 22 and the support arm assemblies 12. A metal ferrule 25, that has both internal threads 44 (which engage the threads of the second threaded adjustment bolt 42) and external threads 45 which engage the body of the second adjustment member 30 is shown in FIG. 3.

The components of the table saw extension apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved table saw extension apparatus that is low in cost, relatively simple in design and operation, and which may advantageously be used to provide a single extension unit for a table saw. With the invention, a table saw extension apparatus is provided which is attachable to the table saw and does not need a separate wheeled base. With the invention, a table saw extension apparatus is provided which does not use adjustment chains. With the invention, a table saw extension apparatus is provided which does not require its own respective table leg support. With the invention, a table saw extension apparatus is provided which includes an adjustment mechanism for adjusting the extension in a horizontal or lateral dimension in addition to adjusting the vertical height of the extension. With the invention, a table saw extension apparatus is provided which does not employ telescopic strum that extend from the base of the extension support to one of the extension arms. With the invention, a table saw extension apparatus is provided which provides a single adjustment clement that can be used for both vertical and horizontal adjustments of the extension unit. With the invention, a table saw extension apparatus is provided which can be adjusted in an "X" direction and a "Y" direction such as in an X-Y grid for a plane.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved table saw extension apparatus, comprising:
    a pair of support arm assemblies attachable to respective ends of a table saw, and
    a cross member assembly supported by said support arm assemblies, said cross member assembly including means for relative vertical adjustment of said cross member assembly with respect to said support arm assemblies, and said cross member assembly including means for relative horizontal adjustment of said cross member assembly with respect to said support arm assemblies,
    wherein said cross member assembly includes,
    a vertically oriented base member attached to said support arm assemblies,
    a vertically oriented first adjustment member adjustably connected to said base member, said first adjustment member including a plurality of vertical channels permitting said first adjustment member to be adjusted vertically with respect to said base member, said first adjustment member also including a horizontal channel,
    a first securing assembly for securing said first adjustment member with respect to said base member at a selected vertical adjustment position with respect to said base member,
    a second adjustment member supported by said horizontal channel in said first adjustment member, wherein said second adjustment member can be slid horizontally in said horizontal channel in said first adjustment member for permitting said second adjustment member to be adjusted horizontally with respect to said first adjustment member and said support arm assemblies, and
    a second securing assembly for securing said second adjustment member with respect to said first adjustment member.

2. The apparatus described in claim 1 wherein said support arm assemblies are connected to the table saw with bolts.

3. The apparatus described in claim 1 wherein said base member is connected to said support arm assemblies by bolts.

4. The apparatus described in claim 1 wherein said first securing assembly includes:
    a first threaded adjustment bolt for screwing into a first complementary threaded portion in said base member, and
    a first knob, connected to said first threaded adjustment bolt, for controlling adjustment of said first threaded adjustment bolt into said base member, wherein said first adjustment member is positioned between said first knob and said base member for being clamped between said first knob and said base member when said first threaded adjustment bolt is screwed into said base member.

5. The apparatus described in claim 1 wherein:
    said horizontal channel of said first adjustment member is in the form of a trapezoidal-cross-section groove, and
    said second adjustment member includes a trapezoidal-cross-section tongue that slides in said trapezoidal-cross-section groove of said horizontal channel.

6. The apparatus described in claim 1 wherein said second securing assembly includes:
    a second threaded adjustment bolt for screwing into a second complementary threaded portion in said second adjustment member, and
    a second knob, connected to said second threaded adjustment bolt, for controlling adjustment of said second threaded adjustment bolt into said second adjustment member, wherein said second adjustment member is positioned between said second knob, and said first adjustment member for being clamped between said second knob and said first adjustment member when said second threaded adjustment bolt is screwed into said first adjustment member.

* * * * *